(12) United States Patent
Holmberg et al.

(10) Patent No.: US 6,832,383 B2
(45) Date of Patent: Dec. 14, 2004

(54) MEMS DISK DRIVE AND METHOD OF MANUFACTURE THEREFOR

(75) Inventors: Michael Holmberg, Lafayette, CO (US); David A. Rich, Whitehall, PA (US)

(73) Assignee: Agere Systems Inc., Allentown, PA (US)

(*) Notice: Subject to any disclaimer, the term of this patent is extended or adjusted under 35 U.S.C. 154(b) by 31 days.

(21) Appl. No.: 10/175,435

(22) Filed: Jun. 19, 2002

(65) Prior Publication Data

US 2003/0235140 A1 Dec. 25, 2003

(51) Int. Cl.[7] .............................................. G11B 17/02
(52) U.S. Cl. ...................................................... 720/654
(58) Field of Search ........................ 369/244; 360/244, 360/264.4, 265.7, 98.07, 265.6, 101; 310/261, 12

(56) References Cited

U.S. PATENT DOCUMENTS

| | | | |
|---|---|---|---|
| 5,191,251 A | 3/1993 | Paratte ........................ 310/309 |
| 5,412,265 A | 5/1995 | Sickafus ................ 310/40 MM |
| 5,579,190 A | * 11/1996 | Mastache et al. ......... 360/265.6 |
| 5,631,514 A | 5/1997 | Garcia et al. ................ 310/309 |
| 5,870,249 A | * 2/1999 | Yanagisawa ................. 360/101 |
| 6,115,215 A | * 9/2000 | Adams et al. ............. 360/264.4 |
| 6,122,149 A | 9/2000 | Zhang et al. ............. 360/294.5 |
| 6,157,522 A | 12/2000 | Murphy et al. ........... 360/294.6 |
| 6,163,434 A | 12/2000 | Zhang ....................... 360/294.5 |
| 6,204,588 B1 | * 3/2001 | Springer ...................... 310/261 |
| 6,208,485 B1 | * 3/2001 | Chainer et al. ........... 360/98.07 |
| 6,380,661 B1 | 4/2002 | Henderson et al. ..... 310/323.02 |
| 6,411,472 B1 | * 6/2002 | Allsup ...................... 360/265.7 |
| 6,512,313 B2 | * 1/2003 | Choi et al. ..................... 310/12 |

* cited by examiner

Primary Examiner—Tianjie Chen

(57) ABSTRACT

A data storage drive, a method of manufacturing the same, and a drive array that includes multiple such disk storage drives. In one embodiment, the disk storage drive includes: (1) a substrate, (2) a motor located on the substrate, (3) a data storage medium coupled to the motor for movement thereby and (4) a MEMS read arm located on the substrate, having a read head and capable of responding to control signals by moving to cause the read head to traverse portions of the data storage medium thereby to read data therefrom.

14 Claims, 4 Drawing Sheets

MEMS DISK DRIVE AND METHOD OF MANUFACTURE THEREFOR

TECHNICAL FIELD OF THE INVENTION

The present invention is directed, in general, to data storage devices and, more specifically, to a data storage drive, a method of manufacturing the data storage drive, and a data storage array employing the data storage drive.

BACKGROUND OF THE INVENTION

A disk drive assembly is a data storage device from which data may be read and/or to which such data may be written. Typically, a disk drive assembly includes one or more randomly-accessible storage media (e.g., disks) upon which data is encoded by various means. In a magnetic disk drive, the data is encoded thereon as bits of information comprising magnetic field reversals grouped in tracks on the surface of the storage medium. Alternatively, the disk drive may be an optical disk drive reading/writing optical field reversals rather than magnetic field reversals.

A motor imparts movement to the storage media. A read head is positionable proximate the storage media to read the data from the storage media. For a magnetic disk drive, the read head detects magnetic field signal changes on the magnetic media. Such detection may be discerned from changes in the resistance of the read head responsive to changes in the direction and amount of magnetic flux being sensed by the read head.

The read head is supported by a read arm. Movement may be imparted to the read arm, and, hence, to the read head by appropriate actuation of the read arm, such as by a voice coil motor (VCM). Successive read and write operations can be selectively performed by suitably positioning and repositioning the read head and an associated write read proximate selected locations of the storage media.

Advancements in technology have permitted the development and implementation of successive generations of disk drive assemblies of ever-improving performance characteristics and memory capacities, of ever-smaller physical sizes, and at ever-lesser costs. However, existing disk drive assemblies are becoming less able to provide adequate performance and storage capacity, in view of the demands of the devices in which disk drives are employed, including decreased physical size and increased performance of the devices themselves.

Disk drive product lines employing a recording medium of 1.0 inches to 1.8 inches, such as the IBM MicroDrive product line, are some of the recent attempts at providing increased performance and storage capacity with disk drives having a sufficiently small physical size to fit within the physical confines of modern portable and desktop electronics. However, these drives also suffer from disadvantages, including increased power consumption that leads to shorter battery life for mobile devices and limited usability. One factor contributing to this increased power consumption is the significant masses of the moving parts in the Micro-Drive. One skilled in the art understands that moving parts having significant masses require significant power to operate, the additional power being attributable to overcoming the momentum of the moving parts. The significant masses of these moving parts also render the device more susceptible to performance degradation attributable to physical shock, such as by mis-handling by the user.

In addition, the electrical performance of devices containing conventional disk drives can be disadvantageous. Problems associated with electrical performance of conventional disk drives may be attributable to the considerable distance separating the physical disk drive and the other electronics of the devices, including the read control electronics. Such problems have long been believed to be unavoidable, in view of the conventional configuration of mounting the integrated circuit electronics separate from the disk drive.

Accordingly, what is needed in the art is a data storage drive that overcomes the above-described disadvantages of conventional disk drives.

SUMMARY OF THE INVENTION

To address the above-discussed deficiencies of the prior art, the present invention provides a data storage drive, a method of manufacturing the same, and a drive array that includes multiple such disk storage drives. In one embodiment, the disk storage drive includes: (1) a substrate, (2) a motor located on the substrate, (3) a data storage medium coupled to the motor for movement thereby and (4) a Micro Electrical Mechanical Systems (MEMS) read arm located on the substrate, having a read head and capable of responding to control signals by moving to cause the read head to traverse portions of the data storage medium thereby to read data therefrom.

Accordingly, the present invention presents the concept of providing a MEMS level data storage drive wherein one or more of the components of the data storage drive are MEMS components. By employing one or more MEMS components, the data storage drive may require significantly lower power consumption due to the reduced masses inside the storage drive. This decreased power consumption may provide increased battery life in the devices employing the data storage drive. The reduced mass of the data storage drive may also provide improved mechanical shock performance, such mechanical shock normally attributable to mis-handling by a user of the device.

In addition, the electrical performance of the data storage drive may be superior to other disk drive technologies, in view of the close proximity of the data storage drive to the integrated circuit interconnects, which thereby requires shorter interconnect paths. Those having skill in the art understand that shorter interconnect paths allow for increased signal output and an accompanying decrease in electronic noise as compared to the interconnect paths of conventional disk drives. Additionally, shorter interconnect paths are also less susceptible to damage.

Additionally, the data storage device of the present invention may be very small. For instance, in one embodiment, the data storage device may have lateral dimensions less than about 500 $\mu$m. In that regard, it may be the first known data storage device having the disk drive inside an integrated circuit chip, instead of having the chip inside the disk drive.

The present invention may also provide the potential to link many data storage drives together inside an integrated circuit, such that their performance input/output may be a parallel process instead of a serial process, as required by conventional disk drives. This potential may allow integrated circuit storage devices to operate as a miniature and/or mobile integrated circuit server.

In one embodiment of the present invention, the motor may be selected from the group consisting of: (1) a rotary motor and (2) a linear motor. The motor may also be MEMS motor. The motor may be formed integral to the substrate of the data storage drive.

In one embodiment of the present invention, the data storage medium may be disk-shaped or circular. However, the data storage medium may also be other shapes, including rectangular or box-shaped. To that end, the data storage medium may be rotated or translated underneath the MEMS read arm for access to the data thereon. The data storage medium may also spin continuously.

In one embodiment of the present invention, the data storage medium may be selected from the group consisting of: (1) a magnetic medium and (2) an optical medium. Accordingly, the read head may be an optical read head or a magnetic read head. The read head may also be a read/write head. The MEMS read arm may also include more than one read head.

In one embodiment of the present invention, the MEMS read arm may be a first MEMS read arm, and the data storage drive may further include a second MEMS read arm located on the substrate and having a second read head. The first and second MEMS read arms may cooperate to respond to the control signals to read data from the data storage medium.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description when read with the accompanying FIGUREs. It is emphasized that, in accordance with the standard practice in the industry, various features are not drawn to scale. In fact, the dimensions of the various features may be arbitrarily increased or reduced for clarity of discussion. Reference is now made to the following descriptions taken in conjunction with the accompanying drawings, in which.

DETAILED DESCRIPTION

Figure 1:
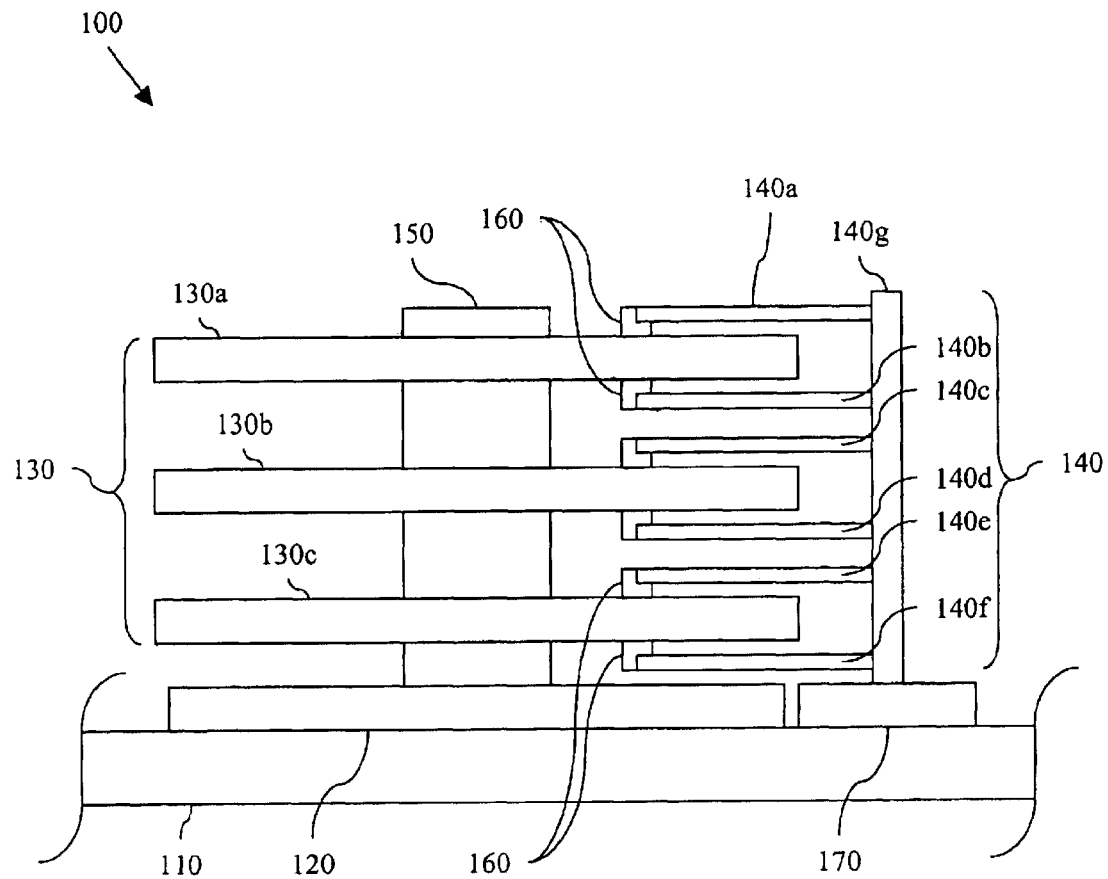
FIG. 1 illustrates a side elevation view of one embodiment of a data storage drive constructed according to the principles of the present invention.

Referring initially to FIG. 1, illustrated is a side elevation view of one embodiment of a data storage drive 100 constructed according to the principles of the present invention. The data storage drive 100 may include a substrate 110, a motor 120, a data storage medium 130, and a MEMS read arm 140.

In the embodiment shown, the motor 120 is a rotary motor 120. However, in other embodiments the motor 120 may be a linear motor, as described below. The motor 120 may be coupled to the substrate 110. In an advantageous embodiment, the motor 120 may be formed integral to the substrate 110. For example, the motor 120 may be a MEMS motor formed by stereolithography on the substrate 110. The manufacture and operation of exemplary MEMS rotary motors are described in U.S. Pat. No. 5,631,514 to Garcia, et al., U.S. Pat. No. 5,412,265 to Sickafus, and U.S. Pat. No. 5,191,251 to Paratte, which are herein incorporated in their entirety by reference.

The data storage medium 130, which may be a magnetic or optical storage medium, may be coupled to the motor 120 for movement thereby. In that regard, the data storage medium 130 may comprise a material selected from cobalt, nickel, chromium, platinum, tantalum or compounds thereof. The data storage medium 130 may have a magnetic or optical coating thereon, wherein the material and/or the coating is capable of storing bytes of data. The data storage medium may be subdivided into sectors, tracks, cylinders or columns, in a manner similar to that of conventional data storage mediums employed in disk drives.

The data storage medium 130 may be coupled directly to the motor 120 or, as shown, may be indirectly coupled to the motor 120 by a spindle 150. In the embodiment shown, the data storage medium 130 may be circular or disk-shaped. However, as will be discussed below, the data storage medium 130 be shaped otherwise. In addition, the data storage medium 130 may include a plurality of platters 130a–130c. Each of the platters 130a–130c may itself be an optical or magnetic data storage medium, and may store data on one or both sides.

The MEMS read arm 140 may be located on or moveably coupled to the substrate 110. In an advantageous embodiment, the MEMS read arm 140 may be formed by stereolithography to be moveably integral to the substrate 110. The MEMS read arm 140 may, therefore, be formed by conventional MEMS manufacturing techniques. The MEMS read arm 140 includes a read head 160, and is capable of responding to control signals by moving to cause the read head 160 to traverse portions of the data storage medium 130 thereby to read data therefrom. To that end, the data storage device 100 may also include a MEMS read arm driver 170. The MEMS read arm driver 170 may be a smaller version of the motor 120, capable of imparting rotational motion to the MEMS read arm 140. In one embodiment, the read head 160 may be a read-write head 160, capable of both reading data from and writing data to the data storage medium 130.

In the embodiment shown, the MEMS read arm 140 may include a plurality of MEMS read arms 140a–140f, each configured to access a corresponding surface of the data storage medium. In such an embodiment, the MEMS read arms 140a–140f may be coupled to a common shaft 140g, which may cause each of the read heads 160 to traverse portions of the data storage medium 130 simultaneously.

Figure 2:
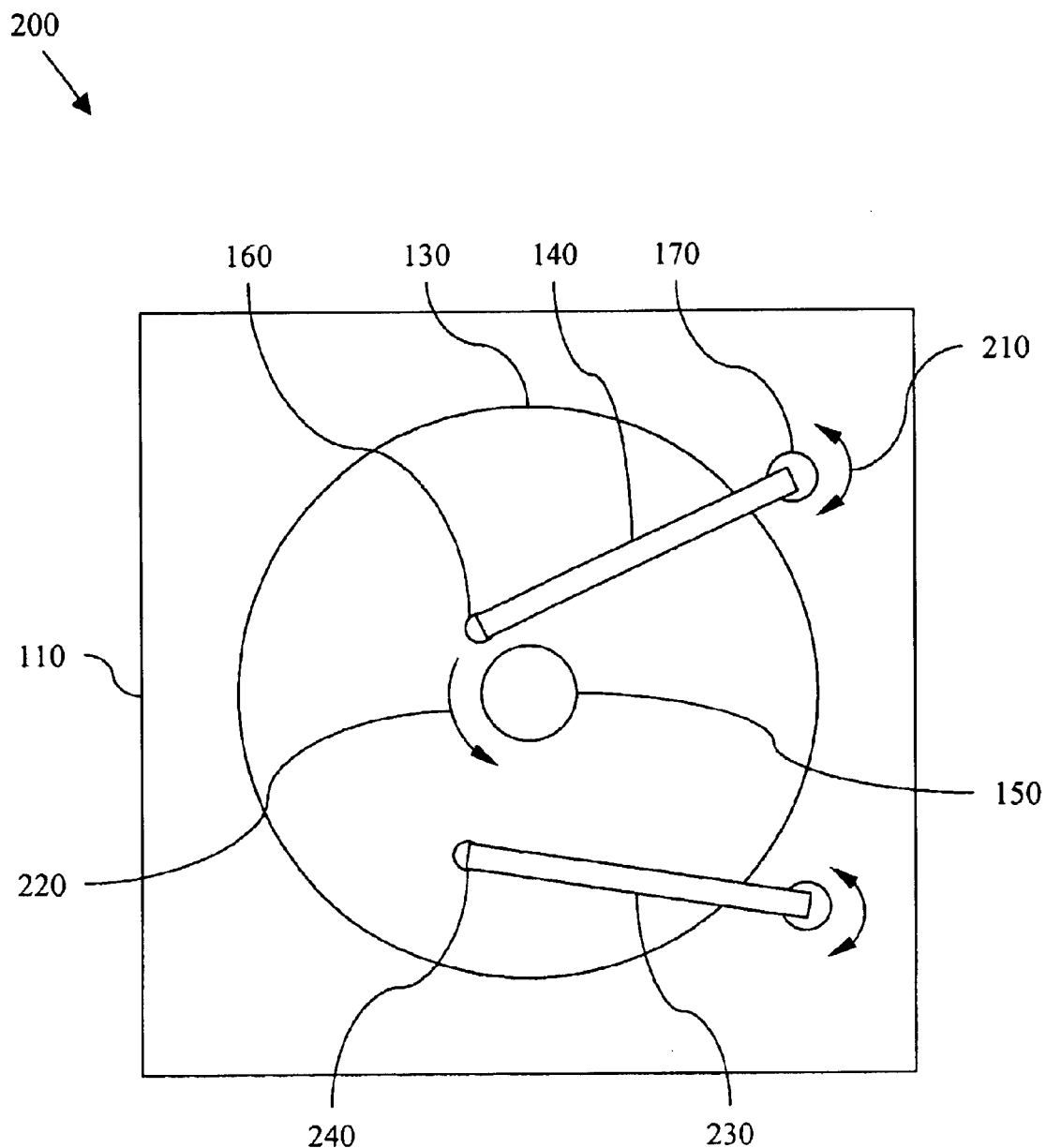
FIG. 2 illustrates a plan view of another embodiment of a data storage drive shown constructed according to the principles of the present invention.

Turning to FIG. 2, illustrated is a plan view of another embodiment of a data storage device 200 shown constructed according to the principles of the present invention. The data storage device 200 may be similar to the data storage device 100 shown in FIG. 1. As shown in the illustrated embodiment, the MEMS read arm 140 may rotatably oscillate in the direction of the arrow 210, in response to control signals provided by internal or external circuitry (not shown). The data storage medium 130 also spins in the direction of the arrow 220. In one embodiment, the data storage medium 130 may spin in only one direction, while in other embodiments the data storage medium 130 may rotatably oscillate. The data storage medium 130 may spin continuously, or may spin intermittently in response to control signals provided internal or external circuitry (not shown).

In the embodiment shown, the MEMS read arm 140 is a first read arm 140 having a first read head 160, and the data storage device 200 further includes a second MEMS read arm 230 having a second read head 240. The second MEMS read arm 230 and second read head 240 may be similar to the first MEMS read arm 140 and first read head 160, respectively. The first and second MEMS read arms 140, 230 may cooperate to respond to control signals provided internal or external circuitry (not shown) to read data from the data storage medium 130.

Figure 3:
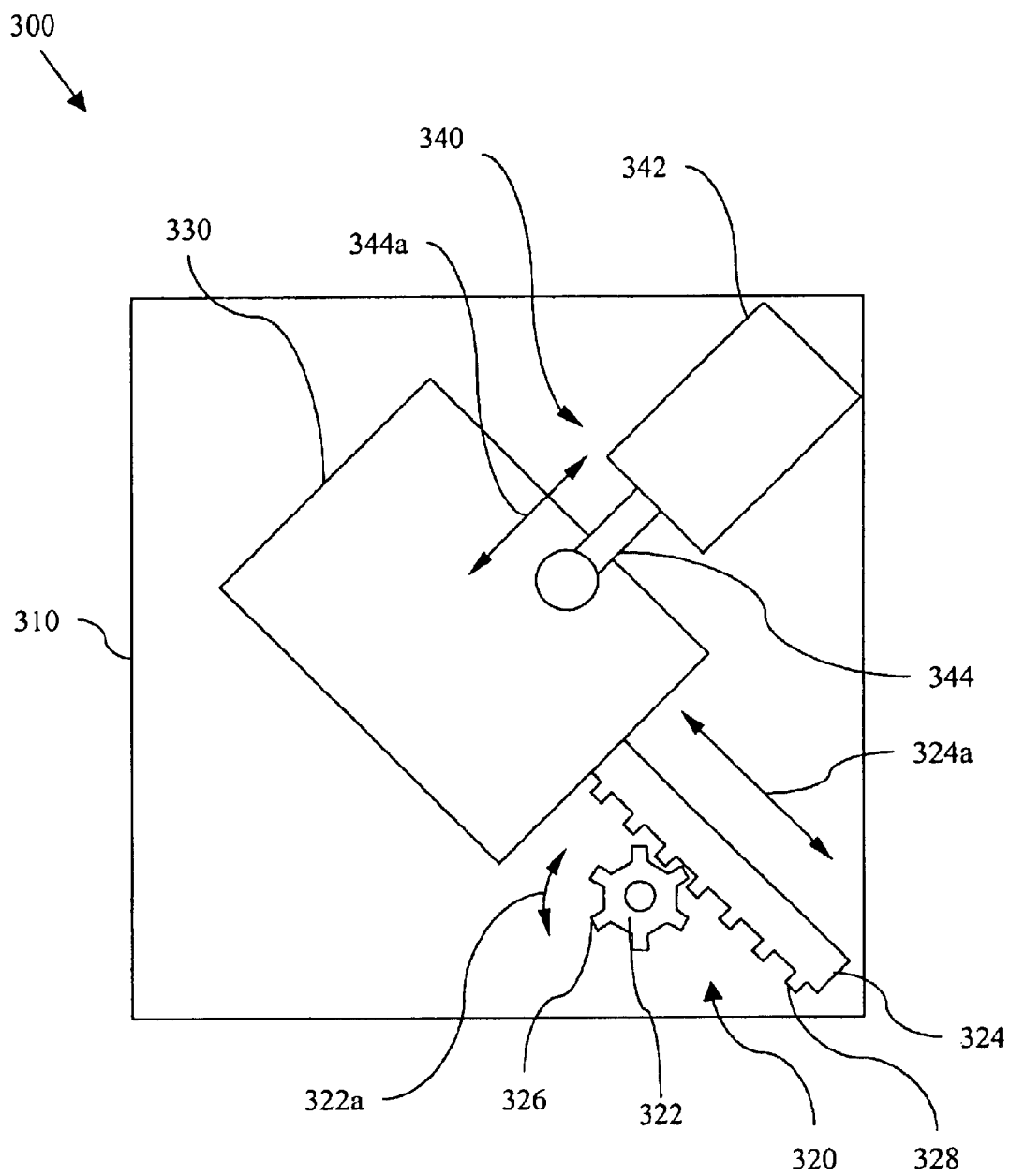
FIG. 3 illustrates a plan view of yet another embodiment of a data storage drive constructed according to the principles of the present invention.

Turning to FIG. 3, illustrated is a plan view of another embodiment of a data storage drive 300 constructed according to the principles of the present invention. The data storage drive 300 may include a substrate 310, a motor 320, a data storage medium 330 coupled to the motor 320, and a MEMS read arm 340. The motor 320 may be coupled to the substrate 310 and the data storage medium 330, to move the data storage medium 330 across the substrate 310.

In the embodiment shown, the motor 320 may be a linear motor, and may include a gear 322 and an actuator 324. The gear 322 may include teeth 326 that mesh with ridges 328 on the actuator 324. Oscillating rotary motion of the gear 322, as indicated by the arrow 322a, may impart oscillating linear motion to the actuator 324, as indicated by the arrow 324a. The oscillating linear motion of the actuator 324 may impart oscillating linear motion to the data storage medium 330, as also indicated by the arrow 324a.

In an advantageous embodiment, the motor 320 may be formed integral to the substrate 310. For example, the motor 320 may be a MEMS motor formed by stereolithography on the substrate 310. The manufacture and operation of exemplary MEMS linear motors are described in U.S. Pat. No. 6,380,661 to Henderson, et al., and U.S. Pat. No. 5,631,514 to Garcia, et al., which are herein incorporated in their entirety by reference.

The data storage medium 330, which may be a magnetic or optical storage medium, may be coupled to the motor 320 for movement thereby. In the embodiment shown, the data storage medium 330 may be rectangular or box-shaped. As discussed above with reference to FIG. 1, the data storage medium 330 may include a plurality of platters (not shown). Each of the platters may be an optical or magnetic data storage medium, and may store data on one or both sides.

The MEMS read arm 340 may be located on or moveably coupled to the substrate 310. In an advantageous embodiment, the MEMS read arm 340 may be formed by stereolithography to be moveably integral to the substrate 310. The MEMS read arm 340 may, therefore, be formed by conventional MEMS manufacturing techniques. The MEMS read arm 340 includes a read head 360, and is capable of responding to control signals by moving to cause the read head 360 to traverse portions of the data storage medium 330 thereby to read data therefrom. In one embodiment, the read head 360 may be a read-write head 360, capable of reading/writing data from/to the data storage medium 330.

The MEMS read arm 340 may include a linear motor similar to the motor 320. However, as in the embodiment shown, the MEMS read arm 340 may be a different linear motor, and may include an actuator 342 and a member 344 coupled between the actuator 342 and the read head 360. The actuator 342, which may be or include a MEMS motor, may impart oscillating motion to the member 344, as indicated by the arrow 344a.

Figure 4:
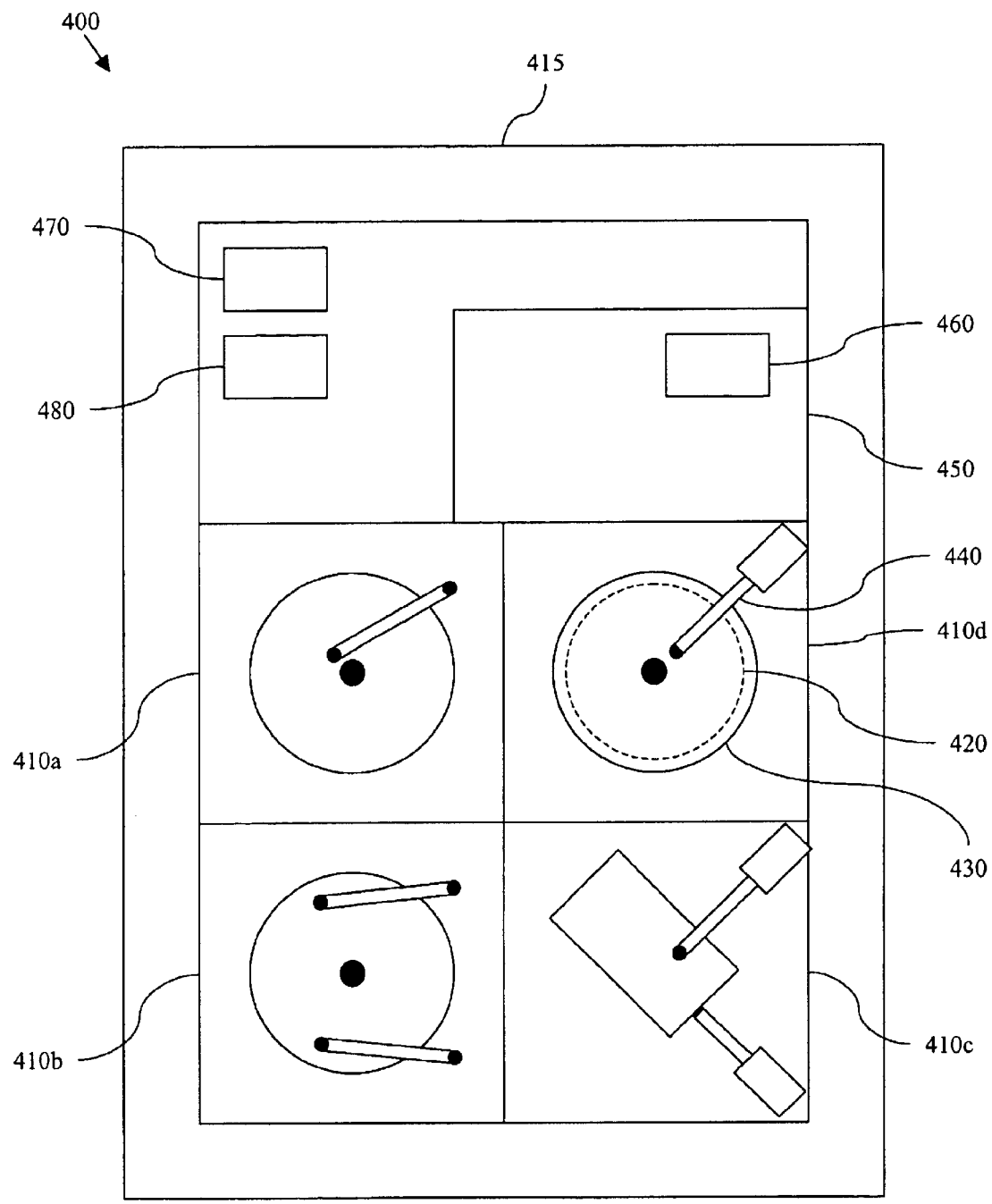
FIG. 4 illustrates a plan view of one embodiment of a data storage array constructed according to the principles of the present invention.

Turning to FIG. 4, illustrated is a plan view of one embodiment of a data storage array 400 constructed according to the principles of the present invention. The data storage array 400 may form one environment in which the data storage devices 100, 200 and 300 may be employed. In the embodiment shown, the data storage array 400 includes a plurality of data storage devices 410a–410d located on a substrate 415. Each of the data storage devices 410a–410d may be similar to one of the data storage devices 100, 200 and 300 shown in FIGS. 1–3. For instance, the data storage device 410a may be similar to the data storage device 100 shown in FIG. 1, the data storage device 410b may be similar to the data storage device 200 shown in FIG. 2, and the data storage device 410c may be similar to the data storage device 300 shown in FIG. 3. However, in an alternative embodiment, each of the data storage devices 410a–410d may be a hybrid of the components of the data storage devices 100, 200 and 300 shown in FIGS. 1–3. For instance, in the embodiment shown, the data storage device 410d may include a motor 420 (shown by the hidden lines) that may be similar to the motor 120 shown in FIG. 1, a data storage medium 430 that may be similar to the data storage medium 230 shown in FIG. 2, and a MEMS read arm 440 that may be similar to the MEMS read arm 340 shown in FIG. 3.

By providing the capability of incorporating multiple data storage drives on a single substrate, the present invention may provide the potential to link many data storage drives together inside an integrated circuit, such that their performance input/output may be a parallel process instead of a serial process, as required by conventional disk drives. This potential may allow the integrated circuit storage devices to operate as a miniature and/or mobile integrated circuit server.

In addition, the data storage array 400 of the present invention may be employed in an application-specific integrated circuit (ASIC). Accordingly, the data storage array 400 may be designed for a special application, such as for a particular kind of transmission protocol or a hand-held computer. Those having skill in the art understand that an ASIC may be employed in a wide range of applications, including auto emission control, environmental monitoring, portable communications devices, and personal digital assistants (PDAs). Additionally, the data storage array 400, including the ASIC embodiment, may be pre-manufactured for a special application, or may be custom manufactured for a particular application.

The data storage array 400 may also include an array controller 450 formed on the substrate 415 and electrically coupled to each of the data storage devices 410a–410d by interconnects or traces (not shown). The array controller 450 may provide control signals to independently drive the data storage devices 410a–410d. In an advantageous embodiment, the array controller 450 may include a phase-locked loop (PLL) circuit 460, as known to those having skill in the art.

The data storage array 400 may also include one or more electrical components 470 coupled to or formed integrally with the substrate 415. The electrical components 470 may be selected from the group consisting of controllers, amplifiers, read channels, processors and other application-specific components or circuitry conventionally employed in disk drives. The data storage array 400 may also include one or more optical components 480 coupled to or formed integrally with the substrate 415. The optical components 480 may be selected from the group consisting of processors, controllers, read channels, amplifiers and other application-specific components conventionally employed in optical drives.

Although the present invention has been described in detail, those skilled in the art should understand that they can make various changes, substitutions and alterations herein without departing from the spirit and scope of the invention.

What is claimed is:

1. A data storage drive within an integrated circuit chip, comprising:

a substrate;

a motor located on said substrate;

a data storage medium coupled to said motor for movement thereby; and a MEMS read arm located on said substrate, having a read head and capable of responding to control signals by moving to cause said read head to traverse portions of said data storage medium thereby to read data therefrom.

2. The drive as recited in claim 1 wherein said motor is selected from the group consisting of:

a rotary motor, and a linear motor.

3. The drive as recited in claim 1 wherein said motor is a MEMS motor.

4. The drive as recited in claim 1 wherein said data storage medium is rectangular.

5. The drive as recited in claim 1 wherein said data storage medium is selected from the group consisting of:

a magnetic medium, and an optical medium.

6. The drive as recited in claim 1 wherein said read head is a read/write head.

7. The drive as recited in claim 1 wherein said MEMS read arm is a first MEMS read arm, said drive further comprising a second MEMS read arm located on said substrate and having a second read head, said first and second MEMS read arms cooperating to respond to said control signals to read data from said data storage medium.

8. A method of manufacturing a data storage drive within an integrated circuit chip, comprising:

forming a motor on a substrate;

coupling a data storage medium to said motor for movement thereby; and fabricating a MEMS read arm on said substrata, said MEMS read arm having a read head located proximate said data storage medium.

9. The method as recited in claim 8 wherein said motor is selected from the group consisting of:

a rotary motor, and a linear motor.

10. The method as recited in claim 8 wherein said motor is a MEMS motor.

11. The method as recited in claim 8 wherein said data storage medium is rectangular.

12. The method as recited in claim 8 wherein said data storage medium is selected from the group consisting of:

a magnetic medium, and an optical medium.

13. The method as recited in claim 8 wherein said read head is a read/write head.

14. The method as recited in claim 8 wherein said MEMS read arm is a first MEMS read arm, said method further comprising fabricating a second MEMS read arm located on said substrate and having a second read head located proximate said data storage medium.

* * * * *